(12) United States Patent
An et al.

(10) Patent No.: US 9,720,589 B2
(45) Date of Patent: Aug. 1, 2017

(54) TOUCH DISPLAY DEVICE INCLUDING VISUAL ACCELERATOR

(71) Applicant: SAMSUNG DISPLAY CO., LTD., Yongin, Gyeonggi-Do (KR)

(72) Inventors: Bo Young An, Hwaseong-si (KR); Min-Weun Kim, Seoul (KR); Sang Rak Kim, Cheonan-si (KR); Dong Rock Seo, Asan-si (KR); Seong-Keun Ha, Asan-si (KR)

(73) Assignee: Samsung Display Co., Ltd., Yongin, Gyeonggi-do (KR)

( * ) Notice: Subject to any disclaimer, the term of this patent is extended or adjusted under 35 U.S.C. 154(b) by 66 days.

(21) Appl. No.: 14/672,386

(22) Filed: Mar. 30, 2015

(65) Prior Publication Data
US 2016/0077618 A1    Mar. 17, 2016

(30) Foreign Application Priority Data
Sep. 16, 2014  (KR) .......................... 10-2014-0122798

(51) Int. Cl.
*G06F 3/0488* (2013.01)
*G06F 3/041* (2006.01)

(52) U.S. Cl.
CPC .......... *G06F 3/0488* (2013.01); *G06F 3/0412* (2013.01); *G06F 3/0416* (2013.01)

(58) Field of Classification Search
CPC .............................. G06F 3/0412; G06F 3/0416
See application file for complete search history.

(56) References Cited

U.S. PATENT DOCUMENTS

| | | | | |
|---|---|---|---|---|
| 5,272,470 A * | 12/1993 | Zetts | .................... | G06F 3/04883 178/19.01 |
| 6,664,968 B2 * | 12/2003 | Ono | ....................... | G06F 3/1438 345/532 |
| 7,075,541 B2 * | 7/2006 | Diard | .................... | G06T 15/005 345/502 |
| 7,561,116 B2 * | 7/2009 | Westerinen | ........... | G06F 1/1601 345/1.1 |
| 8,248,387 B1 * | 8/2012 | Ramanathan | ......... | G06F 3/0416 178/18.09 |
| 8,310,459 B2 * | 11/2012 | Nurmi | ..................... | G06F 3/041 345/1.1 |
| 8,810,543 B1 * | 8/2014 | Kurikawa | ............. | G06F 3/0416 178/18.06 |
| 8,973,016 B1 * | 3/2015 | Hatch | ..................... | G06F 9/542 719/318 |
| 9,007,314 B2 * | 4/2015 | Liu | ........................ | G06F 3/041 178/18.03 |
| 9,158,452 B2 * | 10/2015 | Motta | .................... | G06F 3/0488 |

(Continued)

FOREIGN PATENT DOCUMENTS

KR    10-2003-0040396 A    5/2003
KR    10-2014-0126263    10/2014

*Primary Examiner* — Patrick F Marinelli
(74) *Attorney, Agent, or Firm* — Lee & Morse, P.C.

(57) ABSTRACT

A touch display device includes a touch sensor, a visual accelerator, and a display. The touch sensor senses a touch. The visual accelerator visualizes the touch. The display displays information corresponding to the visualized touch. When the touch is outside a visual acceleration area, the visual accelerator does not process the touch. When the touch is in the visual acceleration area, the visual accelerator visualizes the touch on the display.

17 Claims, 8 Drawing Sheets

(56) References Cited

U.S. PATENT DOCUMENTS

| | | | |
|---|---|---|---|
| 9,389,717 B2* | 7/2016 | Bathiche | G06F 3/147 |
| 2007/0109280 A1* | 5/2007 | Sigona | G06F 3/038 |
| | | | 345/177 |
| 2010/0277505 A1 | 11/2010 | Ludden et al. | |
| 2011/0069015 A1* | 3/2011 | Nurmi | G06F 3/041 |
| | | | 345/173 |
| 2011/0157193 A1* | 6/2011 | Boucher | G06F 3/1438 |
| | | | 345/505 |
| 2013/0201112 A1* | 8/2013 | Large | G06F 3/04883 |
| | | | 345/173 |
| 2013/0201118 A1* | 8/2013 | Liu | G06F 3/0416 |
| | | | 345/173 |
| 2013/0201176 A1* | 8/2013 | Lee | G09G 5/003 |
| | | | 345/214 |
| 2013/0257798 A1* | 10/2013 | Tamura | G06F 3/044 |
| | | | 345/174 |
| 2013/0265243 A1* | 10/2013 | Law | G06F 1/3262 |
| | | | 345/173 |
| 2013/0271487 A1* | 10/2013 | Lincoln | G06F 3/0488 |
| | | | 345/619 |
| 2014/0111443 A1* | 4/2014 | Guo | G06F 3/0416 |
| | | | 345/173 |
| 2014/0168096 A1* | 6/2014 | Bathiche | G06F 3/0412 |
| | | | 345/173 |
| 2014/0184517 A1* | 7/2014 | Motta | G06F 3/0488 |
| | | | 345/173 |
| 2014/0191991 A1* | 7/2014 | Flowers | G06F 1/3215 |
| | | | 345/173 |
| 2014/0327692 A1* | 11/2014 | Mishra | G06F 3/1438 |
| | | | 345/593 |
| 2015/0035769 A1* | 2/2015 | Shahparnia | G06F 3/041 |
| | | | 345/173 |
| 2015/0049032 A1* | 2/2015 | Simmons | G06F 3/0416 |
| | | | 345/173 |
| 2015/0116226 A1* | 4/2015 | Goins | G06K 9/00402 |
| | | | 345/173 |
| 2015/0269906 A1* | 9/2015 | Mishra | G06F 3/1438 |
| | | | 345/694 |
| 2015/0277653 A1* | 10/2015 | Xiong | G06F 3/0414 |
| | | | 345/173 |
| 2015/0279074 A1* | 10/2015 | Xiong | G06F 3/0418 |
| | | | 345/629 |
| 2015/0301678 A1* | 10/2015 | Park | G06F 3/0416 |
| | | | 345/173 |
| 2015/0338951 A1* | 11/2015 | Lee | G06F 3/044 |
| | | | 345/174 |
| 2016/0004375 A1* | 1/2016 | Xiong | G06F 3/0418 |
| | | | 345/173 |
| 2016/0077618 A1* | 3/2016 | An | G06F 3/0488 |
| | | | 345/173 |
| 2016/0092021 A1* | 3/2016 | Tu | G06F 3/0416 |
| | | | 345/173 |
| 2016/0139778 A1* | 5/2016 | An | G06F 3/04845 |
| | | | 345/173 |
| 2016/0195975 A1* | 7/2016 | Baum | G06F 3/0416 |
| | | | 345/174 |

* cited by examiner

| (Address) | | Touch Area | | | | | | | | |
|---|---|---|---|---|---|---|---|---|---|---|
| Type | | D7 | D6 | D5 | D4 | D3 | D2 | D1 | D0 | HEX |
| Command | | | | | | | | | | T.B.D. |
| 1st Para. | | TM_XS[7] | TM_XS[6] | TM_XS[5] | TM_XS[4] | TM_XS[3] | TM_XS[2] | TM_XS[1] | TM_XS[0] | xx |
| 2nd Para. | | TM_XE[7] | TM_XE[6] | TM_XE[5] | TM_XE[4] | TM_XE[3] | TM_XE[2] | TM_XE[1] | TM_XE[0] | xx |
| 3rd Para. | | TM_YS[7] | TM_YS[6] | TM_YS[5] | TM_YS[4] | TM_YS[3] | TM_YS[2] | TM_YS[1] | TM_YS[0] | xx |
| 4th Para. | | TM_YE[7] | TM_YE[6] | TM_YE[5] | TM_YE[4] | TM_YE[3] | TM_YE[2] | TM_YE[1] | TM_YE[0] | xx |

TOUCH DISPLAY DEVICE INCLUDING VISUAL ACCELERATOR

CROSS-REFERENCE TO RELATED APPLICATION

Korean Patent Application No. 10-2014-0122798, filed on Sep. 16, 2014, and entitled, "Touch Display Device Including Visual Accelerator," is incorporated by reference herein in its entirety.

BACKGROUND

1. Field

One or more embodiments described herein relate to a touch display device including a visual accelerator.

2. Description of the Related Art

A touch display device includes a sensing unit for receiving a touch input. In operation, the sensing unit sends a touch signal along a signal path that passes through various processing circuits and applications before reaching the display. Sending the touch signal along this path produces a delay. If the delay is significant, the display may be perceived as having a slow response time.

SUMMARY

In accordance with one embodiment, a touch display device includes a touch sensor to sense a user touch, the touch sensor including an area set as a visual acceleration area; a display to display an image; and a visual accelerator to visualize the touch when the touch is sensed in the visual acceleration area, wherein the display is to display information corresponding to the visualized touch. The device may also include a data processor to process data to be displayed on the display.

The device may also include a first signal path including a data processing path passing through the touch sensor, the visual accelerator, and the display, and a second path including a data processing path passing through the touch sensor, the data processor, and the display, wherein a latency time of the first path is less than the second path. The data processor may include at least one of a processor, an operating system, or one or more application layers. The data processor and the visual accelerator may be independently driven. The data processor and the visual accelerator may include separate processors.

The device may include a first area which corresponds to at least a part of an area outside the visual acceleration area of the touch sensor, wherein the data processor is to generate information based on the sensed touch when the touch is sensed in the first area. The data processor and the visual accelerator may be linked with each other when driven.

The data processor may generate information indicative of at least one of a color, a thickness, or a pattern according to the sensed touch, the information corresponding to setting data, and the visual accelerator may receive the setting data. The visual accelerator may receive the setting data at a predetermined cycle interval. The visual accelerator may visualize the sensed touch according to the setting data. The visualized touch information may be at least one of a dot, a line, or a surface.

In accordance with another embodiment, a system includes an input to receive a touch signal; a first signal path for the touch signal; and a second signal path for the touch signal, wherein each of the first and second signal paths is between the input and a display, the first signal path including a visual accelerator to perform a first operation based on the touch signal and the second signal path excluding the visual accelerator and including an operating system, the first signal path bypassing the operating system and having a latency time less than a latency time of the second signal path.

The first signal path may perform the first operation when the touch signal corresponds to a touch in a first screen area; and the second signal path may perform a second operation when the touch is in a second screen area outside the first screen area. The first signal path may withhold outputting information for producing a visual response to the touch signal on the display when the touch is in the second screen area.

The system may include a memory in or coupled to the visual accelerator, wherein the memory is to store information for executing the first operation to be performed by the visual accelerator based on the touch signal. The information stored in the memory of the visual accelerator may be generated by a data processor in the second signal path before the touch signal is received by the input. The first signal path may output information for producing a visual response to the touch signal on the display.

In accordance with another embodiment, a method for controlling a display includes receiving a touch signal; passing the touch signal through a first path based on a first condition; and passing the touch signal through a second path based on a second condition, wherein the first signal path includes a visual accelerator to perform a first operation based on the touch signal and the second signal path excludes the visual accelerator and includes an operating system, and wherein the first signal path bypasses the operating system and has a latency time less than a latency time of the second signal path. The first condition may include when the touch signal corresponds to a touch in a first screen area; and the second signal path may include when the touch is in a second screen area outside the first screen area.

BRIEF DESCRIPTION OF THE DRAWINGS

Features will become apparent to those of skill in the art by describing in detail exemplary embodiments with reference to the attached drawings in which:

FIG. 7 illustrates an example of an instruction set;

DETAILED DESCRIPTION

Figure 1:
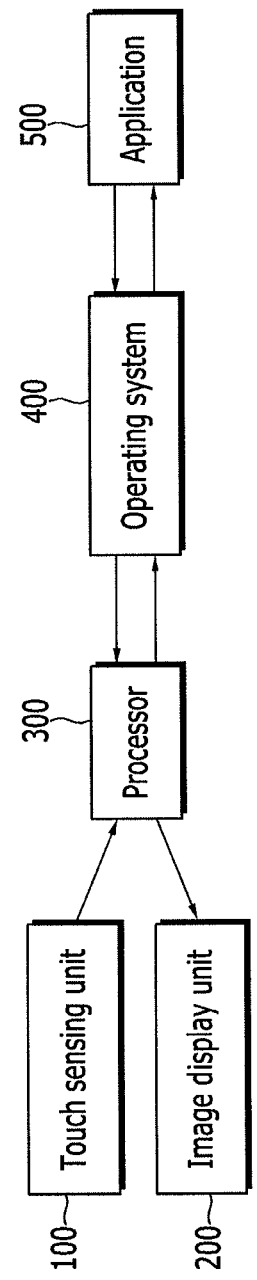
FIG. 1 illustrates one type of touch display device.

Example embodiments are described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. In the drawings, the dimensions of layers and regions may be exaggerated for clarity of illustration. Like reference numerals refer to like elements throughout.

FIG. 1 illustrates data flow in one type of touch display device which has been proposed. Referring to FIG. 1, the touch display device includes a touch screen panel (TSP), which includes a touch sensing unit 100, an image display unit 200, a processor 300, an operating system 400, and an application 500. In operation touch information passes through the touch sensing unit 100 and is input to a TSP integrated circuit (IC). It takes time (e.g., 100 ms or more) for the touch information to be reflected to the image display unit 200 through the processor 300, the operating system 400, and the application 500. As a result, a viewer may recognize the device to have a time latency of about 30 ms, and the device may be recognized as having a slow touch response time.

Figure 2:
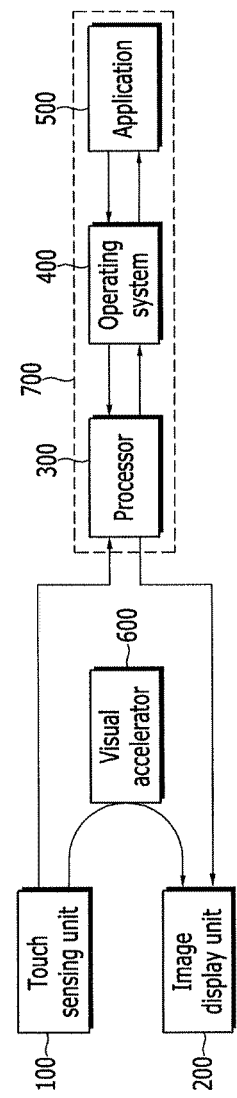
FIG. 2 illustrates an embodiment of a touch display device.

FIG. 2 illustrates data flow in one embodiment of a touch display device which includes a touch sensing unit 100, an image display unit 200, a visual accelerator 600, a processor 300, an operating system 400, and an application 500. In FIG. 2, a hardware layer and a logic layer are illustrated in order to show the data flow. In one embodiment, the touch sensing unit 100, the image display unit 200, the visual accelerator 600, and the processor 300 may be the hardware layers, and the operating system 400 and the application 500 may be logic layers.

A touch sensing function of the touch sensing unit 100 may be implemented by a sensor. The sensor may be classified into various types including but not limited to a resistive type, a capacitive type, an electro-magnetic (EM) type, or an optical type.

The image display unit 200 may be any one of a variety of display devices. Examples include a plasma display, a liquid crystal display, a light emitting diode (LED) display, and an organic light emitting diode (OLED) display, which may output still images and/or motion pictures to a viewer. In one embodiment, the touch sensing unit 100 and the image display unit 200 may be integrally formed.

In one embodiment, three layers of the processor 300, the operating system 400, and the application 500 may be considered as corresponding to a data processing unit 700. The data processing unit 700 may further include a memory or an interface coupled to a memory.

The data processing unit 700 processes data to be displayed on the image display unit 200. The data processing unit 700 uses the touch of a user as an input value based on an application 500 currently executed. The user touch may be, for example, a click, a drag, or another type of touch, either with a part of the body or a stylus.

The application 500 may perform an operation based on the position of the user touch. For example, when the application 500 is a notepad application and a coordinate touched by the user corresponds to a setting button of the application 500, a setting value such as a thickness, type, or the color of a line may be selected. When the coordinate touched by the user is a notepad part of the application 500, a figure such as a point, a line, or a surface may be drawn by a predetermined value. The output of the image display unit 200 may be modified in various ways based on the touch input of the user and/or use of the application.

As illustrated in FIG. 2, the process of receiving the user touch from the touch sensing unit 100, processing data in the data processing unit 700, and displaying the processed data in the image display unit 200 may require significant time, e.g., 100 ms or more. The data processing path passing through the touch sensing unit 100, the data processing unit 700, and the image display unit 200 may be referred to as a second path.

In accordance with the present embodiment, a first data processing path may pass through the visual accelerator 600, e.g., the first path may pass through the touch sensing unit 100, the visual accelerator 600, and the image display unit 200, bypassing the data processing unit 700. The visual accelerator 600 may be, for example, a low latency visual accelerator (LLVA).

In one embodiment, the visual accelerator 600 and the data processing unit 700 may be independently driven. For example, the visual accelerator 600 and the data processing unit 700 may include separate processors. Further, the visual accelerator 600 and the data processing unit 700 may include separate memories.

The visual accelerator 600 may independently perform one or more predetermined functions corresponding to the user touch. For example, when a user touch (for example, dragging) is input, a drawing function may be immediately performed with reference to setting data including one or more predetermined colors, thicknesses, patterns, and the like. Thus, when the touch is sensed, the visual accelerator 600 may immediately (or within a short period of time) visualize (e.g., generate graphics, text, or other information on a screen of the image display unit 200 corresponding to) the sensed touch. In this case, data flow may pass through the first path. The visual touch information may be, for example, at least one of a dot, a line, or a surface.

Information indicative of one or more predetermined colors, thicknesses, patterns, and the like, may be already stored in the memory of the visual accelerator 600, for example, as a result of an operation of the data processing unit 700, before drawing. For example, the data processing unit 700 may generate information for at least one of a color, thickness, or pattern in advance for one or more touch locations or types of touches, and then may output information for storage in the memory of the visual accelerator 600 as setting data.

The visual accelerator 600 may receive the setting data, for example, at a predetermined cycle interval in order to reduce response latency time. In another embodiment, the visual accelerator 600 may receive the setting data immediately whenever the setting data is output. In another embodiment, a setting value stored in the memory of the visual accelerator 600 as a default, without any information or control from the data processing unit 700.

Because processing through the first path does not pass through the data processing unit 700, the latency time of the first path may be substantially reduced compared to the second path. Accordingly, the user may not recognize any (or only a slight) latency between the time the touch is input to the time the display device responds to the touch input, e.g., performs an operation that is visually recognizable in response to the touch signal.

In accordance with one embodiment, signal flow according to the touch input of the user passes through not only the first path and/or the second path, but also a third path through the touch sensing unit 100, the data processing unit 700, the visual accelerator 600, and the image display unit 200. In this case, the sequential order of the visual accelerator 600 and the data processing unit 700 may be changed in the signal flow.

Figure 3:
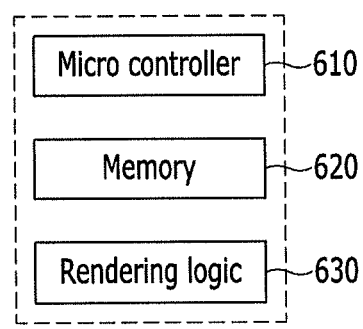
FIG. 3 illustrates an embodiment of a visual accelerator.

FIG. 3 illustrates an embodiment of the visual accelerator 600 which includes a micro controller 610, a memory 620, and rendering logic 630. The visual accelerator 600 may be embedded, for example, in a driver IC or a timing controller. A visual acceleration area to be described below may be set, for example, as a register.

Touch information input from a touch IC is input to the micro controller 610 of the accelerator 600 and stored in the memory 620. The touch information is output to the image display unit 200 through the rendering logic 630. The touch information may be processed in the rendering logic 630, e.g., together with still image or motion picture data transferred through the data processing unit 700. The rendering logic 630 may perform an operation to overlay the touch information transferred to the memory 620 on the image data transferred through the data processing unit.

Figure 4:
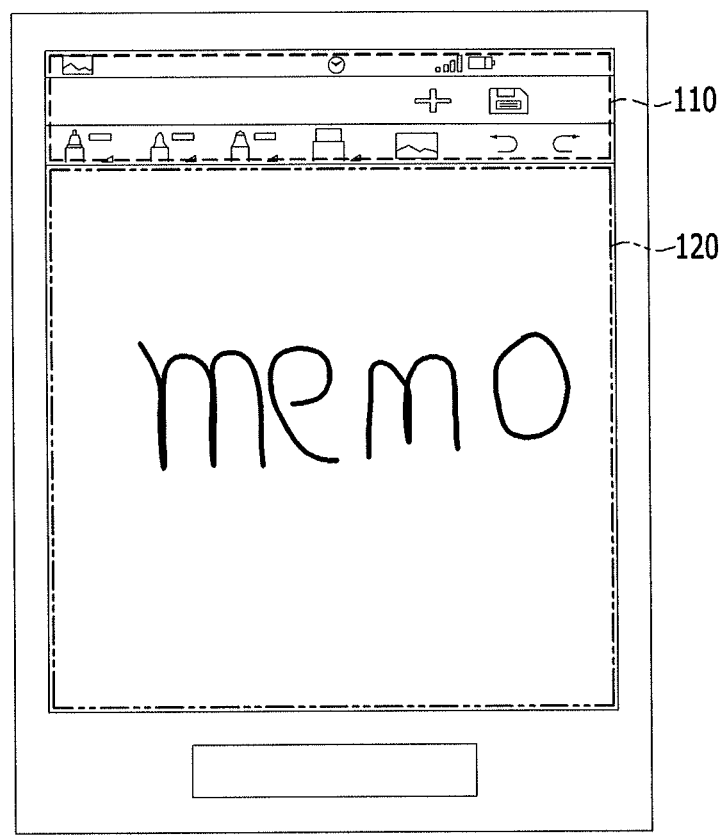
FIG. 4 illustrates areas of one embodiment of a touch sensing unit.

FIG. 4 illustrates an example of a first area 110 and a second area 120 of the touch sensing unit 100. In one embodiment, the touch sensing unit 100 may include a transparent electrode (e.g., an indium tin oxide (ITO) electrode) overlapping the image display unit 200. The application 500 illustrated in FIG. 4 is an example of a memo application. The first area 110 includes various icons, control features, or other regions for setting characteristics of the application (e.g., color, thickness, and/or pattern of a line for the memo application) according to a user touch. The second area 120 is an area in which at least one of a dot, a line, or a surface is drawn according to a user touch in the memo application.

Figure 5:
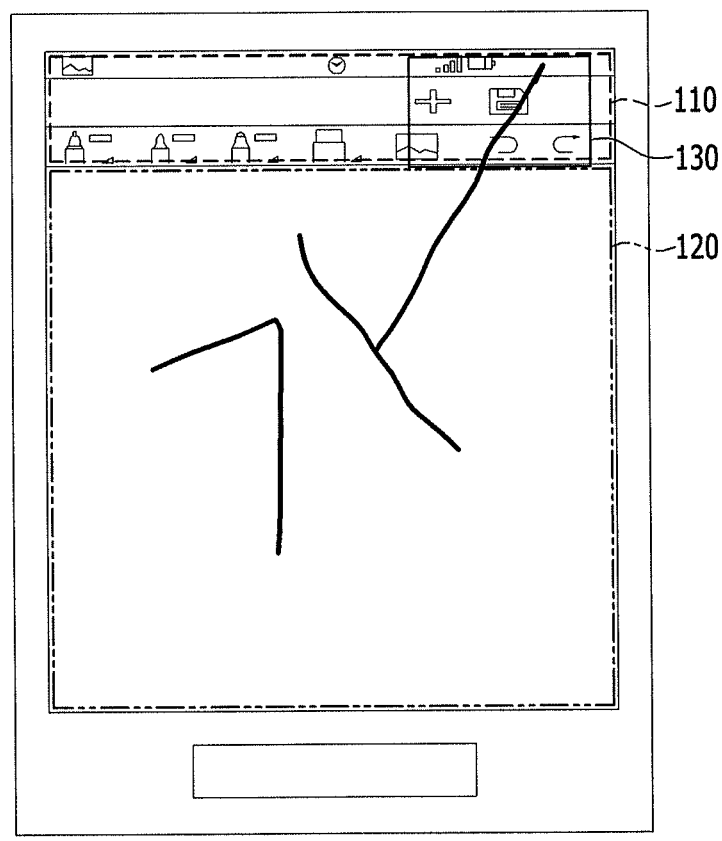
FIG. 5 illustrates areas to which a visual acceleration area is not applied.

FIG. 5 illustrates an example of the first area 110, the second area 120, and a third area 130 of the touch sensing unit 100 to which the visual acceleration area is not applied. Because the visual accelerator 600 immediately visualizes touch information through the first path, an abnormal display effect may occur in the third area 130.

The abnormal display effect may momentarily appear and then disappear according to the configuration of the touch display device or the logic configuration of the application 500. When the time when the abnormal display effect momentarily appears and disappears is a predetermined time (e.g., 30 ms or more), the abnormal display may be recognized by the user. Accordingly, there is a problem in that the abnormal display may be recognized as a product malfunction.

Figure 6:
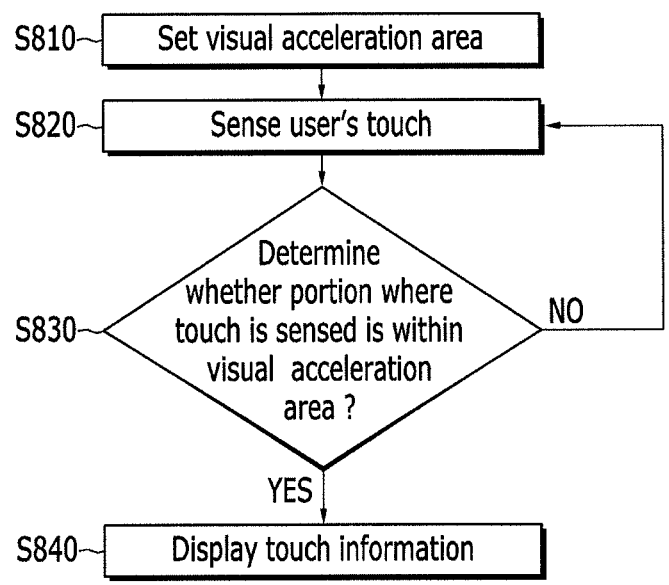
FIG. 6 illustrates an embodiment of a method for driving a touch display device.

FIG. 6 illustrates an embodiment of a method for driving a touch display device, which, for example, may be a touch display device in accordance with any of the aforementioned embodiments. The method includes setting a visual acceleration area by the data processing unit 700 (S810). The visual acceleration area may be set, for example, by designating coordinates of at least a part of the touch sensing unit 100. For example, the start point of an X coordinate may be represented by TM_XS[m:0], the last point of the X coordinate may be represented by TM_XE[m:0], the start point of a Y coordinate may be represented by TM_YS [n:0], and the last point of the Y coordinate may be represented by TM_YE[n:0]. In this case, m and n are values determined, for example, based on resolution of the touch display device.

Setting the visual acceleration area may be designated, for example, in an address area in the driver IC, e.g., like the command set illustrated in FIG. 7. The visual acceleration area may be variably defined, for example, through the data processing unit 700 according to a function of the application 500.

The method also includes an operation for sensing a user touch as an input by the touch sensing unit 100 (S820). This or a previous operation may include enabling the visual accelerator 600.

The method may also include determining whether a portion where the user touch is sensed is within the set visual acceleration area (S830). This operation may be performed by the visual accelerator 600. For example, in operation S810, the visual accelerator 600 may determine whether the user touch occurs within a predetermined (e.g., quadrangular) area defined by X and Y coordinates.

When the user touch is outside the visual acceleration area, the visual accelerator 600 does not process the touch (e.g., this may correspond to a "don't care" condition). In this case, for example, the user touch may be processed through the second path. When the user touch occurs within the visual acceleration area, the visual accelerator 600 visualizes the touch, e.g., transfers signal(s) or information corresponding to the touch to the image display unit 200 for visualization.

The method may also include displaying the transferred signal(s) or visual touch information to be visualized to the image display unit 200 (S840). Accordingly, in one embodiment, when the user touch is outside the visual acceleration area, the touch information is not displayed because there is no room for visualization. Thus, for example, when the user touch is outside the visual acceleration area, the visual accelerator 600 does not process the touch signal, e.g., don't care condition. When the user touch occurs in the visual acceleration area, the visual accelerator 600 visualizes the touch to transfer the visualized touch to the image display unit 200.

Figure 8:
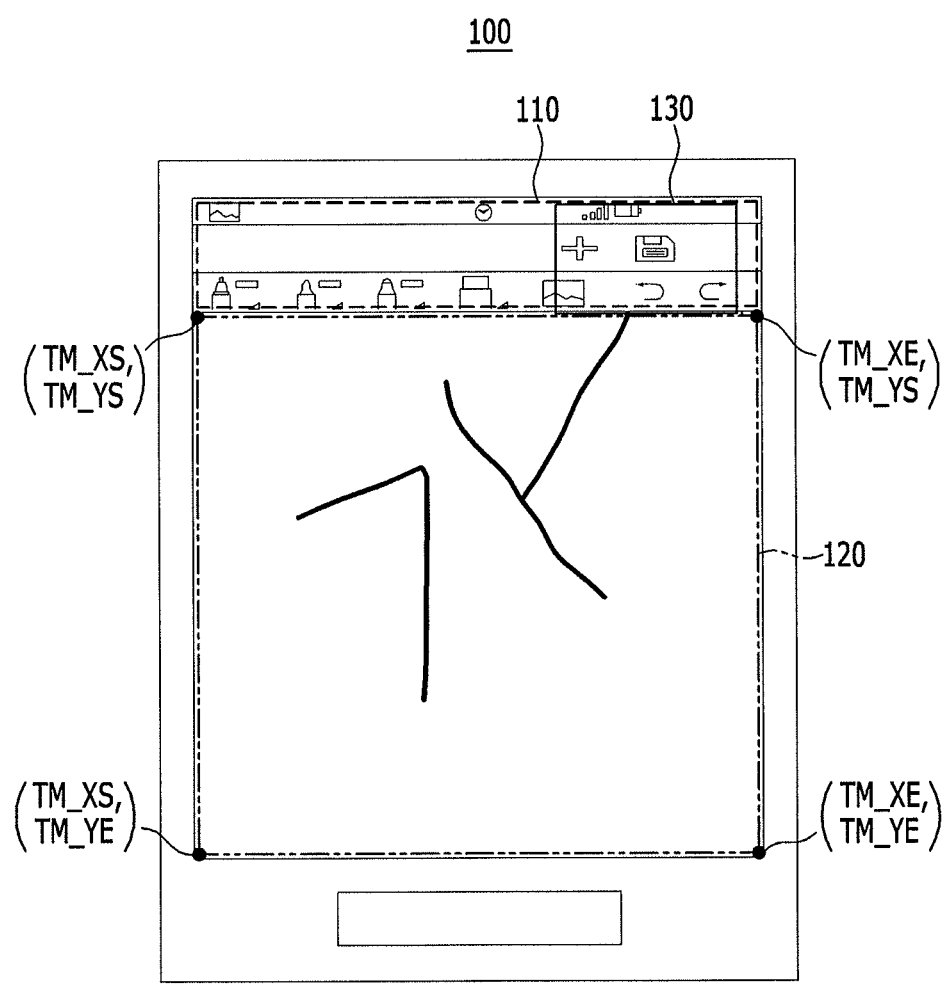
FIG. 8 illustrates areas of the touch sensing unit to which a visual acceleration area is applied.

FIG. 8 illustrates an example of the first area 110, the second area 120, and the third area 130 of the touch sensing unit 100 to which the visual acceleration area is applied according to one embodiment. In FIG. 8, the second area 120 is set as the visual acceleration area. The visual acceleration area of FIG. 8 is a quadrangular area defined by coordinates of (TM_XS, TM_YS), (TM_XE, TM_YS), (TM_XS, TM_YE), and (TM_XE, TM_YE). Accordingly, in the third region 130, which is outside the visual acceleration area, there is no room for representing an abnormal display like in FIG. 5.

In accordance with one or more of the aforementioned embodiments, when an area drawn by the visual accelerator 600 is set as the register in the driver IC, an effective touch solution may be implemented by separately configuring functions of the first area 110 and the second area 120.

Further, when a touch control of the first area 110 and the second area 120 is divided, a multi-touch effect may be implemented. When a predetermined button of the first area 110 is pressed, and when characteristic touch information is input in the second area 120, the characteristic of the drawing is changed, a small letter is changed into a large letter, or other additional functions may be performed.

Further, power consumption may be reduced by displaying the touch information only through the first path.

By way of summation and review, a significant time is required to process and visualize touch information from a touch sensing unit. This is because the touch information is passed through a touch sensor processing integrated circuit. As a result, the touch sensing unit may be perceived by a user to have a slow response time. In accordance with one or more embodiments, a system includes a first signal path for a touch signal and a second signal path for the touch signal. The first signal path includes a visual accelerator to perform a first operation based on the touch signal, and the second signal path excluding the visual accelerator and including an operating system. The first signal path bypassing the operating system and having a latency time less than a latency time of the second signal path.

In accordance with one or more embodiments, the first signal path performs the first operation when the touch signal corresponds to a touch in a first screen area, and the second signal path may perform a second operation when the touch is in a second screen area outside the first screen area.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the present invention as set forth in the following claims.

What is claimed is:

1. A touch display device, comprising:
a touch sensor to sense a touch, the touch sensor including an area set as a visual acceleration area;
a display to display an image;
a data processor to process data to be displayed on the display;
a visual accelerator to visualize the touch when the touch is sensed in the visual acceleration area, wherein the display is to display information corresponding to the visualized touch based on data received from a path that bypasses the data processor; and
a memory in or coupled to the visual accelerator, wherein the memory is to store information for visualizing the touch to be performed by the visual accelerator based on the touch signal and wherein the information stored in the memory of the visual accelerator is to be generated by the data processor before the touch signal is received by the input.

2. The device as claimed in claim 1, further comprising:
a first signal path is to include a data processing path passing through the touch sensor, the visual accelerator, and the display, and
a second path corresponding to the path that bypasses the data processor, the second path to include a data processing path passing through the touch sensor, the data processor, and the display, wherein a latency time of the first path is less than the second path.

3. The device as claimed in claim 2, wherein: the data processor includes at least one of a processor, an operating system, or one or more application layers.

4. The device as claimed in claim 2, wherein: the data processor and the visual accelerator are independently driven.

5. The device as claimed in claim 4, wherein: the data processor and the visual accelerator include separate processors.

6. The device as claimed in claim 4, further comprising:
a first area which corresponds to at least a part of an area outside the visual acceleration area of the touch sensor, wherein the data processor is to generate information based on the sensed touch when the touch is sensed in the first area.

7. The device as claimed in claim 6, wherein: the data processor and the visual accelerator are to be linked with each other when driven.

8. The device as claimed in claim 7, wherein: the data processor is to generate information indicative of at least one of a color, a thickness, or a pattern according to the sensed touch, the information corresponding to setting data, and
the visual accelerator is to receive the setting data.

9. The device as claimed in claim 8, wherein the visual accelerator is to receive the setting data at a predetermined cycle interval.

10. The device as claimed in claim 8, wherein the visual accelerator is to visualize the sensed touch according to the setting data.

11. The touch display device as claimed in claim 10, wherein the visualized touch information is at least one of a dot, a line, or a surface.

12. A system, comprising:
an input to receive a touch signal;
a first signal path for the touch signal;
a second signal path for the touch signal, wherein each of the first and second signal paths is between the input and a display, the first signal path including a visual accelerator to perform a first operation based on the touch signal and the second signal path excluding the visual accelerator and including an operating system, the first signal path bypassing the operating system and having a latency time less than a latency time of the second signal path;
a memory in or coupled to the visual accelerator, wherein the memory is to store information for executing the first operation to be performed by the visual accelerator based on the touch signal and wherein the information stored in the memory of the visual accelerator is to be generated by a data processor in the second signal path before the touch signal is received by the input.

13. The system as claimed in claim 12, wherein:
the first signal path is to perform the first operation when the touch signal corresponds to a touch in a first screen area; and
the second signal path is to perform a second operation when the touch is in a second screen area outside the first screen area.

14. The system as claimed in claim 13, wherein the first signal path is to withhold outputting information for producing a visual response to the touch signal on the display when the touch is in the second screen area.

15. The system as claimed in claim 12, wherein:
the first signal path is to output information for producing a visual response to the touch signal on the display.

16. A method for controlling a display, the method comprising:
receiving a touch signal;
passing the touch signal through a first signal path based on a first condition; and
passing the touch signal through a second signal path based on a second condition,
wherein the first signal path includes a visual accelerator to perform a first operation based on the touch signal and the second signal path excludes the visual accelerator and includes an operating system, and wherein the first signal path bypasses the operating system and has a latency time less than a latency time of the second signal path; the method further comprising:
storing information in a memory in or coupled to the visual accelerator for executing the first operation to be performed by the visual accelerator based on the touch signal, wherein the information stored in the memory of the visual accelerator is to be generated by the operating system in the second signal path before the touch signal is received by the input.

17. The method as claimed in claim 16, wherein:
the first condition includes when the touch signal corresponds to a touch in a first screen area; and
the second signal path includes when the touch is in a second screen area outside the first screen area.

\* \* \* \* \*